United States Patent

[11] 3,594,980

[72] Inventor Charles C. Diehl
904 Ruth St., Belmont, Calif. 94002
[21] Appl. No. 870,430
[22] Filed Oct. 3, 1969
[45] Patented July 27, 1971
Continuation-in-part of application Ser. No. 708,354, Feb. 26, 1968, now abandoned.

[54] TREATING POLLUTED GASES IN BAFFLE CHAMBER
3 Claims, 5 Drawing Figs.
[52] U.S. Cl. ............................................... 55/237,
261/76, 261/118
[51] Int. Cl. ..................................................... B01d 47/16
[50] Field of Search........................................ 55/84, 89,
93, 94, 185—188, 223, 257, 235—237, 465;
261/74, 76, 78, 118

[56] References Cited
UNITED STATES PATENTS
2,802,546 8/1957 Clark............................ 55/223

| | | | |
|---|---|---|---|
| 2,852,239 | 9/1958 | Vicard.......................... | 55/257 |
| 3,370,402 | 2/1968 | Nakai et al................... | 55/94 |
| 2,935,375 | 5/1960 | Boucher....................... | 55/84 |

Primary Examiner—Reuben Friedman
Assistant Examiner—Charles N. Hart
Attorney—Leslie M. Hansen ABSTRACT: For decontaminating, and deodorizing or otherwise treating polluted gases, a stream of gases is introduced into one end and at a lower zone of a baffle chamber which is thoroughly baffled to prevent channelization of the gases therethrough. Spray means discharge a fine mist of decontaminating fluid into the stream of polluted gases closely adjacent their low point of entry into the baffle chamber and in such a direction that the fine mist of spray material is entrained in the incoming gases. As the polluted gases rise and proceed in tortuous paths through the baffle chamber the malodorous chemical elements therein are intimately exposed to the oxidation reduction reaction of the oxidizing agents in the entrained spray material causing drop out of contaminants as a new chemical so that when the gases are discharged from the baffle chamber they are thoroughly reduced to a nonodorous or acceptable odor compound.

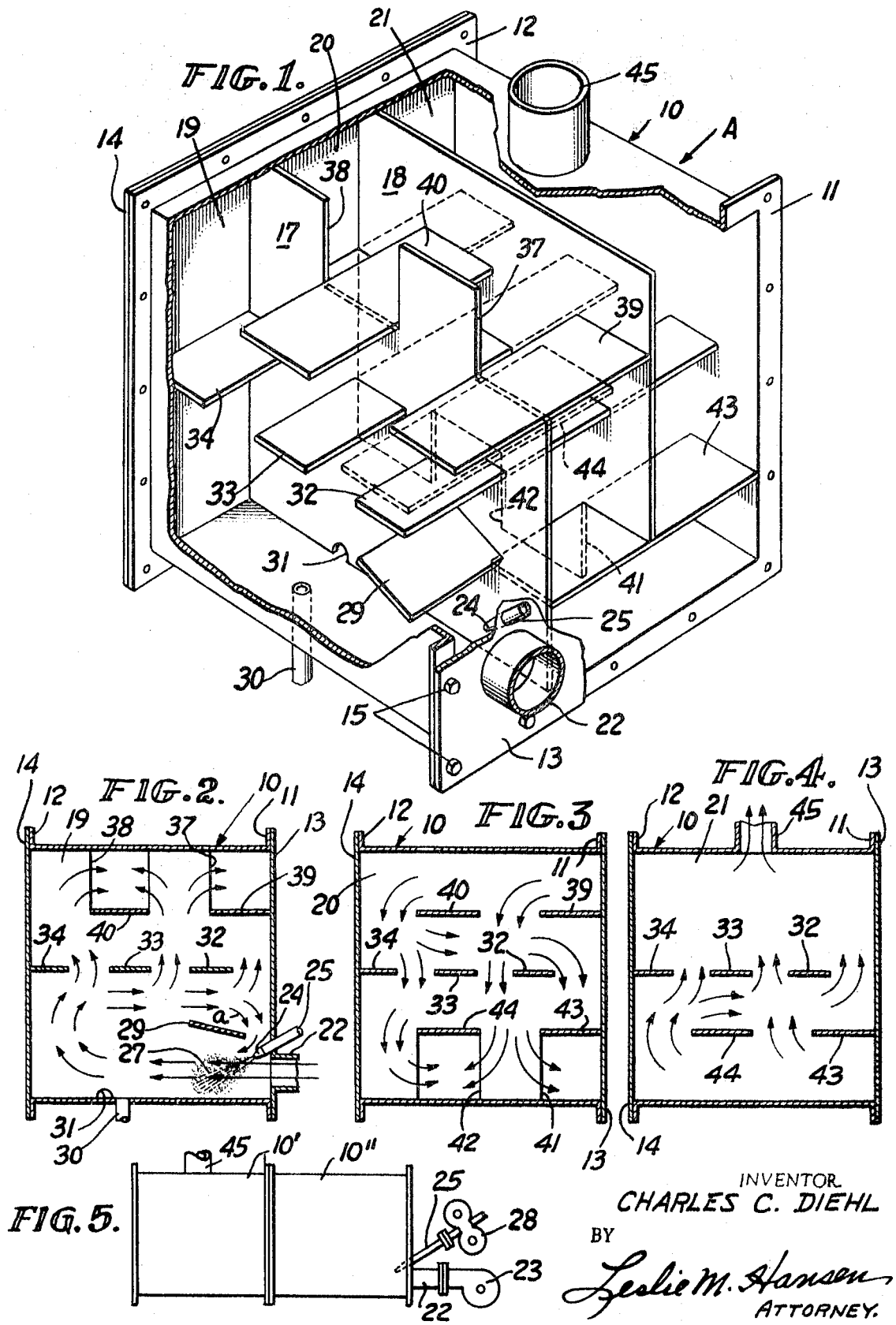

TREATING POLLUTED GASES IN BAFFLE CHAMBER

This application is a continuation-in-part of my copending application Ser. No. 708,354, filed on Feb. 26, 1968, and now abandoned.

BACKGROUND

This invention relates to an apparatus for treating polluted gases by creating better oxidation reduction by molecular contact between odor bearing chemicals in such gases and oxidizing agents to reduce the gases to a nonodorous or acceptable odor compound.

Devices for purifying air and/or removing particles therefrom, commonly known as scrubbers, are generally known. Such known scrubbers are predicated upon introduction of gases into the upper zone of baffle chambers for passage through a downward spray of fluid and/or into and through a level of such fluid plus agitation therewith for the purpose of washing out and removing any heavier than air particles from such gases. No chemical action, such as oxidation reduction is involved. In other words, prior known scrubbers are mainly directed to the filtering out of solids and compounds carried by the gases being treated. They are principally air cleaners or air conditioners as distinguished from rendering such gases inodorous.

SUMMARY OF INVENTION

The present invention contemplates decontamination and deodorization of polluted gases such as exude from sewage systems, manufacturing plants, slaughter houses, scavenger rendering plants and the like. Such gases usually include sulfides and other malodorous noxious elements in volatile form to the detriment and olifactive displeasure of people in adjoining property and areas. The present invention is directed to an apparatus for treating such polluted gases to render them nonodorous or to reduce them to an acceptable odor compound. This can be accomplished by subjecting the polluted gases to an oxidizing agent whereby a chemical reaction takes place in which the odoriferous contaminants in the gases is changed to a compound and the remaining gases reduced to a nonodorous or acceptable odorous condition. This entails the well-known principle of oxidation reduction, the present invention being directed to a method and apparatus by which oxidation reduction can be carried out in a simple and economical manner.

To treat odors to deodorize them into a condition wherein they are not perceptive or offensive to the olifactory senses of human beings very often does not require full chemical reduction of the sulfides or other odoriferous elements. In order to reduce such odoriferous elements down to an inoffensive or acceptable odor compound they must be subjected to an oxidizing agent sufficiently to bring about the chemical change. Since by nature suitable nontoxic oxidizers are inorganic and nonvolatile, contact must be made between the molecular structure of both the oxidizing agent and the contaminants in the gases. The present invention seeks to accomplish this phenomenon by creating a better molecular contact between the chemical oxidizing agent and the polluted gases.

The present invention seeks to accomplish oxidation reduction quickly in a minimum of space and in an effective manner such as to reduce the gaseous compound to a nonodorous or acceptable odor compound. It further seeks to accomplish this chemical change by an economical feature of initially treating the gases with an atomized cloud or fine vaporized spray mist of the oxidizing chemical solution rather than merely passing the gases through a falling spray of the solution in liquid form or through a bath thereof. To this end it is an object of the present invention to provide a baffle chamber constructed in multiple compartments in which the contaminated gases first enter the lower region of a mixing compartment so baffled as to effect recirculation and thorough admixture of the gases with an oxidant containing chemical compound in vaporized mist form. The vaporized admixture is recirculated prior to ascension of the vaporized mixture to an upper zone of the mixing compartment where it communicates with a second baffled compartment. The object here is to create better molecular contact between the contaminants in the gases and the chemical oxidizing agents in the spray to thereby accelerate oxidation reduction within the mixing compartment whereby the contaminants are changed into a chemical compound or a natural element. These chemical compounds or elements thus become solids which are heavier than the remaining vapor and therefore drop out prior to ascension and passage of the remaining gaseous vapors over into the upper region of a second baffled compartment. The second baffled compartment is so baffled that the remaining vaporized gases in descending through tortuous obstructing passages effect a continuation of the swirling and recirculating action of the vaporized admixture resulting in further oxidation reduction and drop out of heavier oxidized chemical compounds therefrom. It is a further object to transfer the remaining vaporized gaseous mixture from the bottom of the second compartment into the lower region of a third baffled compartment wherein and by reason of the baffled interior thereof the vaporized gases are caused to swirl and recirculate to further effect oxidation reduction and cause any remaining heavier chemical compounds or elements thus created to drop out prior to ascension of the treated vaporized gases to the upper region of the third compartment for discharge from the baffle chamber. In this manner the treated gases are reduced to a nonodorous or acceptable odor compound.

A preferred baffle chamber for the practice of the invention is shown in the accompanying drawings, wherein:

FIG. 1 is a perspective view of the baffle chamber, a major portion of an end closure plate and the top and near sidewalls of a rectangular, tubular unit being broken away.

FIG. 2 is a vertical, longitudinal, sectional view in reduced scale of the left hand compartment of the baffle chamber shown in FIG. 1, arrows indicating generally the direction of gas flow therethrough.

FIG. 3 is a similar sectional view through the central compartment of the baffle chamber.

FIG. 4 is a similar sectional view through the right-hand compartment of the baffle chamber.

FIG. 5 is a side-elevational view in reduced scale of a double-length baffle chamber.

Referring to the drawings in detail, an illustrative baffle chamber A (FIG. 1) comprises a generally rectangular tubular unit 10, which preferably is made of fiberglass, and is formed by laying up glass fiber, for example, in woven, mat, or chopped-fiber form, wetted with a suitable plastic, such as, for example, polyethylene, on a rectangular, collapsible core of a conventional type, not shown. End flanges 11 and 12 are provided on the rectangular, tubular unit 10, and end plates 13 and 14 are secured in sealed relation to opposite ends thereof by bolts 15. Partitions 17 and 18 are provided in the baffle chamber A to divide the interior of the baffle chamber into three compartments, comprising a left-hand mixing compartment 19, a central compartment 20, and a right-hand compartment 21.

A gas inlet pipe 22 is fitted into an opening provided therefor in the lower left-hand portion of the end plate 13 and polluted gases are forced through this inlet pipe under selected pressure into the mixing compartment 19 by suitable means such as a conventional sirocco blower 23 (FIG. 5). Spray means, comprising an air pressure spray nozzle 24 on the end of a high-pressure fluid supply line 25 is directed to discharge a spray or fine fog mist 27 (FIG. 2) of oxidant containing fluid into and across the stream of incoming gases discharged into the baffle chamber through the gas inlet pipe 22. A conventional air pressure spray pump, such as that shown at 28 in FIG. 5 supplies the oxidant containing fluid to the nozzle 24 at a selected pressure such as to create a vaporized mist or fog-like cloud of gas-oxidant mixture.

An inclined lower baffle 29 is provided in the mixing compartment 19 above the incoming admixture of gases and vaporized oxidant adjacent the pipe 22. The inclined baffle 29 is spaced from the end plate 13 with its lower end adjacent the inlet pipe 22 so as to cause a recirculation of the gas-oxidants vapor in the mixing compartment 19 as indicated by the arrows a in FIG. 2. Thus molecular contact between the chemical oxidants in the spray and contaminants in the gases takes place. A massive oxidation reduction thus takes place in the lower region of the mixing compartment 19 causing oxidized contaminants to drop out prior to ascension of the gaseous admixture. A pipe 30 is provided in the bottom of the mixing compartment 19 to drain off any condensate and heavier chemical resultants of the oxidation reduction.

A limber hole 31 is provided in the lower edge of the first partition 17 to afford similar drainage from the central compartment 20.

Three baffles 32, 33, and 34 extend entirely through all three compartments 19, 20, and 21 of the baffle chamber A, as shown in FIG. 1. Each of these three baffle members 32, 33, and 34 is inserted through aligned, slotted openings provided therefor in both partitions 17 and 18. The baffle 34 is mounted closely adjacent the far end plate 14, while the baffle 32 is spaced from the near end plate 13, the baffles 32, 33 and 34 being substantially on the same horizontal plane, and spaced apart equally. A pair of notches 37 and 38 are provided in the upper end of the first partition 17, for communicating the mixing compartment with the central compartment. A pair of baffles 39 and 40 are mounted on the lower sides of these respective notches 37 and 38 such that the baffles 39 and 40 extend from the near side of the mixing compartment 19 to the second partition 18 in offset relation to the baffles 32, 33 and 34.

The second partition 18 has a pair of notches 41 and 42 in the lower end thereof similar to and in alignment below the upper notches 37 and 38 in the first partition 17. A pair of baffles 43 and 44, generally similar to and in alignment below the upper baffles 39 and 40, are mounted on the upper sides of these respective notches 41 and 42 and extend across both the central and right-hand compartments 20 and 21, respectively. A gas outlet pipe 45 of substantially the same diameter as the inlet pipe 22 is provided in the top of the rectangular unit 10 substantially centrally of the right-hand compartment 21.

In the event that increased capacity may be desired, two or more of the rectangular units 10 may be bolted together, end to end, as shown in FIG. 5, and end plates provided on the ends of the enlarged or double length unit thus provided. Baffles in the two units 10' and 10'' may be similar to the single unit 10 shown in (FIGS. 1—4).

In using the invention, a stream of polluted gases is discharged as by suitable blower means 23 (FIG. 5) through the inlet pipe 22 into the mixing chamber A, concurrent with a spray 27 of suitable fluid containing a chemical compound of a type known to oxidize the contaminants in the specific gases being treated. The oxidizing solution is discharged as by means of conventional air pressure means 28 (FIG. 5), through the spray nozzle 24 into the stream of incoming gases in the form of a fine fog-like mist for entrainment therein. Recirculation of this vaporized admixture in the lower region of the mixing compartment facilitates molecular contact between the chemical oxidants and contaminants in the gases causing a chemical change to take place. The oxidized contaminants as a new chemical become heavier than the vaporized cloud of gas-oxidant mixture. These heavier new chemicals drop out of the vaporized gas-oxidant mixture prior to ascension to the notches 37—38 in the upper zone of the mixing compartment. As the gases entrained with vaporized oxident spray particles traverse their tortuous paths through the three compartments 19, 20 and 21 of the baffle chamber A, they are thoroughly exposed to the oxidation reduction action of the entrained spray material, so that when discharged through the outlet pipe 45 they are thoroughly decontaminated and deodorized.

It will be noted that the right-hand compartment 21 is free of baffles in its upper region adjacent the discharge outlet 45.

By this arrangement agitation of the airstream slows down. Reduction in velocity and expansion of the vaporized gas-oxidant admixture during final ascension allows for condensation and dehydration of the decontaminated gases prior to final exhaust. The discharge from the pipe 45 is a slight vapor which quickly evaporates upon contact with outside air.

The invention is intended for use particularly in installations where polluted gases are discharged into, or collect in, a closed compartment of some type from which the gases can be pumped for discharge at fairly high velocity through a pipe 22 into the mixing chamber A.

In a test setup, two of the rectangular tubular members 10 were bolted together, as shown in FIG. 5 to form a baffle chamber 4 feet by 4 feet by 8 feet, the basic rectangular tubular members 10' and 10'' employed being each 4 feet by 4 feet by 4 feet. Polluted gases were discharged into this baffle chamber at the rate of 450—500 c.f.m. and at a lineal speed of approximately 1,500 f.m. Spray means were provided generally similar to the spray means shown in FIG. 1, and oxidizing fluid was introduced through the spray means at the rate of 2.4 gallons per hour. This setup provided an oxidation reduction action on the polluted gases which was uniform and effective.

The invention is easy to install, relatively inexpensive to build and use, and when all of the parts are made of fiberglass, which is a preferred material, is capable of processing most types of polluted gases and deodorizing materials for indefinite periods, since the fiberglass is not subject to corrosion by most such gases and materials.

While I have illustrated a preferred embodiment of my invention it will be obvious that various modifications can be made therein without departing from the scope of the appended claims.

I claim:

1. A mechanism for treating polluted gases by oxidation reduction comprising:

a baffle chamber having a gas inlet in the lower region of one end thereof and having also a gas discharge outlet at a high point thereof and spaced remotely from the gas inlet, blower means connected to the gas inlet for forcibly inserting polluted gases into the baffle chamber, a plurality of baffles mounted in the baffle chamber between the gas inlet and the gas outlet and so positioned as to create eddy currents in and prevent any direct channeling of gases within the chamber from the inlet to the outlet, air pressure spray means mounted at the zone of entrance of gases forcibly inserted into the baffle chamber via said gas inlet and directed into and across a stream of gases as they enter the baffle chamber, and means for forcing oxidizing fluid into and thorough the air pressure spray means for discharge therefrom in the form of a fine fog spray mist into and across a stream of polluted gases forcibly entering the lower region of said baffle chamber for entrainment in and vaporized admixture with such stream of incoming gases to thereby facilitate molecular contact between the oxidants in said oxidizing fluid and the contaminants in said polluted gases prior to ascension of such gases toward said gas discharge outlet, and an inclined baffle plate disposed transversely of and in the lower region of said baffle chamber and in spaced relation to said gas inlet and with its lower end nearest to and overlying the stream of gases therefrom to thereby create a negative pressure above and adjacent said inlet for recirculating a major portion of the vaporized gas-oxidant admixture in the lower region of said baffle chamber prior to ascension of the remaining gases toward said discharge outlet.

2. A mechanism for treating polluted gases as in claim 1 wherein said baffle chamber comprises:

a rectangular housing;

a first and a second partition in spaced relation within said housing for dividing said baffle chamber into a plurality of compartments including a mixing compartment at the gas inlet end, a discharge compartment at the gas outlet end and a central compartment therebetween;

spaced notches at the upper end of the first partition between the mixing and central compartments for communicating the same;

spaced notches at the lower end of the second partition between the central and discharge compartment for communicating the same and in a plane comparable to the notches in said first partition;

upper baffle means at the lower margin of the notches in said first partition and traversing both of said mixing and central compartments;

lower baffle means at the upper margin of the notches in said second partition and traversing said central and discharge compartments in spaced relation below said upper baffle means; and a plurality of intermediate baffles extending through each of said first and second partitions and across each of said compartments in offset relation to the plane of said upper and lower baffle means.

3. A mechanism for treating polluted gases as claimed in claim 2 wherein the rectangular housing comprises a plurality of similar, rectangular units of similar cross-sectional size and shape connected together, end-to-end to divide the same into additional pairs of central compartments by similarly notched partitions and form a continuous, elongated baffle chamber of multiple units.